US008578084B2

(12) United States Patent
Borchers et al.

(10) Patent No.: US 8,578,084 B2
(45) Date of Patent: Nov. 5, 2013

(54) DATA STORAGE DEVICE HAVING MULTIPLE REMOVABLE MEMORY BOARDS

(75) Inventors: Albert T. Borchers, Santa Cruz, CA (US); Robert S. Sprinkle, Mountain View, CA (US); Andrew T. Swing, Los Gatos, CA (US); Jason W. Klaus, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 609 days.

(21) Appl. No.: 12/537,719

(22) Filed: Aug. 7, 2009

(65) Prior Publication Data

US 2010/0262759 A1 Oct. 14, 2010

Related U.S. Application Data

(60) Provisional application No. 61/167,709, filed on Apr. 8, 2009, provisional application No. 61/187,835, filed on Jun. 17, 2009.

(51) Int. Cl.
*G06F 12/02* (2006.01)
*G06F 13/00* (2006.01)

(52) U.S. Cl.
USPC ..... 711/103; 710/301; 710/305; 711/E12.008

(58) Field of Classification Search
None
See application file for complete search history.

(56) References Cited

U.S. PATENT DOCUMENTS

| 4,449,182 A | 5/1984 | Rubinson et al. |
| 4,777,595 A | 10/1988 | Strecker et al. |
| 5,137,118 A | 8/1992 | Iwata |
| 5,535,416 A | 7/1996 | Feeney et al. |
| 5,619,687 A | 4/1997 | Langan et al. |
| 5,708,814 A | 1/1998 | Short et al. |
| 5,802,345 A | 9/1998 | Matsunami et al. |
| 5,844,776 A | 12/1998 | Yamaguchi et al. |
| 5,941,998 A | 8/1999 | Tillson |
| 6,003,112 A | 12/1999 | Tetrick |
| 6,009,478 A | 12/1999 | Panner et al. |
| 6,167,338 A | 12/2000 | De Wille et al. |

(Continued)

FOREIGN PATENT DOCUMENTS

| EP | 1736885 A2 | 12/2006 |
| JP | 2004-071033 | 3/2004 |

(Continued)

OTHER PUBLICATIONS

Non-Final Office Action for U.S. Appl. No. 12/537,727, mailed on Jun. 3, 2011, 15 pages.

(Continued)

*Primary Examiner* — Kevin Verbrugge
(74) *Attorney, Agent, or Firm* — Brake Hughes Bellermann LLP

(57) ABSTRACT

A data storage device may include a first memory board and a second memory board, where the first memory board and the second memory board each comprise multiple memory chips. The data storage device may include a controller board that is arranged and configured to operably connect to the first memory board and the second memory board, where the controller board includes a high speed interface and a controller that is arranged and configured to receive commands from a host using the high speed interface and to execute the commands, where the first memory board and the second memory board are each separately removable from the controller board.

26 Claims, 7 Drawing Sheets

(56) References Cited

U.S. PATENT DOCUMENTS

| | | | |
|---|---|---|---|
| 6,172,676 B1 | 1/2001 | Wood | |
| 6,313,522 B1 * | 11/2001 | Akram et al. | 257/686 |
| 6,317,330 B1 * | 11/2001 | Portman et al. | 361/742 |
| 6,343,660 B1 | 2/2002 | Mutsears | |
| 6,531,337 B1 * | 3/2003 | Akram et al. | 438/108 |
| 6,531,338 B2 * | 3/2003 | Akram et al. | 438/108 |
| 6,603,198 B2 * | 8/2003 | Akram et al. | 257/686 |
| 6,640,274 B1 | 10/2003 | Huffman et al. | |
| 6,640,290 B1 | 10/2003 | Forin et al. | |
| 6,678,463 B1 | 1/2004 | Pierre et al. | |
| 6,697,284 B2 | 2/2004 | Marotta | |
| 6,757,797 B1 | 6/2004 | Kaiya et al. | |
| 6,781,914 B2 | 8/2004 | Ha | |
| 6,854,022 B1 | 2/2005 | Thelin | |
| 6,868,007 B2 | 3/2005 | Hasegawa et al. | |
| 6,901,461 B2 | 5/2005 | Bennett | |
| 6,931,498 B2 | 8/2005 | Talreja et al. | |
| 6,938,188 B1 | 8/2005 | Kelleher | |
| 6,982,919 B2 | 1/2006 | Kumahara et al. | |
| 7,000,245 B1 | 2/2006 | Pierre et al. | |
| 7,012,632 B2 | 3/2006 | Freeman et al. | |
| 7,024,695 B1 | 4/2006 | Kumar et al. | |
| 7,028,137 B2 | 4/2006 | Nashimoto et al. | |
| 7,080,245 B2 | 7/2006 | Ballard et al. | |
| 7,080,377 B2 | 7/2006 | Peled et al. | |
| 7,088,387 B1 | 8/2006 | Freeman et al. | |
| 7,104,804 B2 * | 9/2006 | Batinovich | 439/71 |
| 7,114,051 B2 | 9/2006 | Guu et al. | |
| 7,127,549 B2 | 10/2006 | Sinclair | |
| 7,127,551 B2 | 10/2006 | Beck | |
| 7,158,167 B1 | 1/2007 | Yerazunis et al. | |
| 7,159,104 B2 * | 1/2007 | Dewey | 713/1 |
| 7,161,834 B2 | 1/2007 | Kumahara et al. | |
| 7,193,306 B2 * | 3/2007 | Akram et al. | 257/686 |
| 7,205,532 B2 * | 4/2007 | Tai et al. | 250/239 |
| 7,225,289 B2 | 5/2007 | Tee et al. | |
| 7,296,213 B2 | 11/2007 | Vainsencher et al. | |
| 7,310,699 B2 | 12/2007 | Sinclair | |
| 7,325,104 B2 | 1/2008 | Satori et al. | |
| 7,328,304 B2 | 2/2008 | Royer, Jr. et al. | |
| 7,356,637 B2 | 4/2008 | Tee et al. | |
| 7,370,230 B1 | 5/2008 | Flake | |
| 7,392,367 B2 | 6/2008 | Clark et al. | |
| 7,406,572 B1 | 7/2008 | Nguyen | |
| 7,546,393 B2 | 6/2009 | Day et al. | |
| 7,562,366 B2 | 7/2009 | Pope et al. | |
| 7,610,443 B2 | 10/2009 | Huang | |
| 7,631,084 B2 | 12/2009 | Thomas et al. | |
| 7,660,306 B1 | 2/2010 | Eriksson et al. | |
| 7,668,177 B1 | 2/2010 | Trapp et al. | |
| 7,730,257 B2 | 6/2010 | Franklin | |
| 7,836,378 B2 | 11/2010 | Shaeffer et al. | |
| 7,865,809 B1 | 1/2011 | Lee et al. | |
| 7,904,639 B2 | 3/2011 | Kim et al. | |
| 7,934,055 B2 | 4/2011 | Flynn et al. | |
| 7,984,316 B2 * | 7/2011 | Kaler | 713/340 |
| 8,037,234 B2 | 10/2011 | Yu et al. | |
| 8,051,253 B2 * | 11/2011 | Okin et al. | 711/154 |
| 8,086,936 B2 | 12/2011 | Gower et al. | |
| 8,205,037 B2 | 6/2012 | Swing et al. | |
| 8,239,713 B2 | 8/2012 | Brochers et al. | |
| 8,239,724 B2 | 8/2012 | Swing et al. | |
| 8,239,729 B2 | 8/2012 | Borchers et al. | |
| 8,244,962 B2 | 8/2012 | Swing et al. | |
| 8,250,271 B2 | 8/2012 | Swing et al. | |
| 8,327,220 B2 | 12/2012 | Borchers et al. | |
| 8,380,909 B2 | 2/2013 | Borchers et al. | |
| 2001/0023472 A1 | 9/2001 | Kubushiro et al. | |
| 2002/0005895 A1 | 1/2002 | Freeman et al. | |
| 2002/0011676 A1 * | 1/2002 | Akram et al. | 257/777 |
| 2002/0053004 A1 | 5/2002 | Pong | |
| 2002/0078285 A1 | 6/2002 | Hofstee et al. | |
| 2002/0144066 A1 | 10/2002 | Talreja et al. | |
| 2002/0178307 A1 * | 11/2002 | Pua et al. | 710/62 |
| 2002/0187587 A1 * | 12/2002 | Akram et al. | 438/108 |
| 2003/0039140 A1 | 2/2003 | Ha | |
| 2003/0058689 A1 | 3/2003 | Marotta | |
| 2003/0101327 A1 | 5/2003 | Beck | |
| 2003/0117846 A1 | 6/2003 | Hasegawa et al. | |
| 2003/0208771 A1 | 11/2003 | Hensgen et al. | |
| 2003/0209791 A1 * | 11/2003 | Akram et al. | 257/678 |
| 2003/0221092 A1 | 11/2003 | Ballard et al. | |
| 2003/0225960 A1 | 12/2003 | Guu et al. | |
| 2004/0017707 A1 * | 1/2004 | Wallace et al. | 365/200 |
| 2004/0049649 A1 | 3/2004 | Durrant | |
| 2004/0078729 A1 | 4/2004 | Peter | |
| 2004/0236933 A1 * | 11/2004 | Dewey | 713/1 |
| 2005/0041509 A1 | 2/2005 | Kumahara et al. | |
| 2005/0160218 A1 | 7/2005 | See et al. | |
| 2005/0172067 A1 | 8/2005 | Sinclair | |
| 2005/0172087 A1 | 8/2005 | Klingman | |
| 2005/0177698 A1 | 8/2005 | Ku et al. | |
| 2005/0188149 A1 * | 8/2005 | Kaler | 711/103 |
| 2005/0193164 A1 | 9/2005 | Royer et al. | |
| 2005/0266610 A1 * | 12/2005 | Akram et al. | 438/107 |
| 2006/0043277 A1 * | 3/2006 | Tai et al. | 250/239 |
| 2006/0053308 A1 | 3/2006 | Zimmerman | |
| 2006/0062052 A1 | 3/2006 | Kumahara et al. | |
| 2006/0123284 A1 | 6/2006 | Hwang et al. | |
| 2006/0184758 A1 | 8/2006 | Satori et al. | |
| 2006/0206653 A1 | 9/2006 | Tee et al. | |
| 2007/0008801 A1 | 1/2007 | Chiang et al. | |
| 2007/0028040 A1 | 2/2007 | Sinclair | |
| 2007/0101238 A1 | 5/2007 | Resnick et al. | |
| 2007/0113150 A1 | 5/2007 | Resnick et al. | |
| 2007/0174509 A1 | 7/2007 | Day et al. | |
| 2007/0198796 A1 | 8/2007 | Warren, Jr. | |
| 2007/0208900 A1 | 9/2007 | Tee et al. | |
| 2007/0255980 A1 | 11/2007 | Urata et al. | |
| 2007/0255981 A1 | 11/2007 | Eto et al. | |
| 2007/0288686 A1 | 12/2007 | Arcedera et al. | |
| 2007/0288692 A1 | 12/2007 | Bruce et al. | |
| 2008/0010431 A1 | 1/2008 | Chang et al. | |
| 2008/0022186 A1 | 1/2008 | Co et al. | |
| 2008/0040531 A1 | 2/2008 | Anderson | |
| 2008/0052448 A1 | 2/2008 | Minz et al. | |
| 2008/0052449 A1 | 2/2008 | Kim et al. | |
| 2008/0052451 A1 | 2/2008 | Pua et al. | |
| 2008/0059747 A1 | 3/2008 | Burckart et al. | |
| 2008/0065815 A1 | 3/2008 | Nasu et al. | |
| 2008/0077727 A1 | 3/2008 | Baca et al. | |
| 2008/0091915 A1 | 4/2008 | Moertl et al. | |
| 2008/0126658 A1 | 5/2008 | Wang | |
| 2008/0147931 A1 | 6/2008 | McDaniel et al. | |
| 2008/0155160 A1 | 6/2008 | McDaniel | |
| 2008/0163030 A1 | 7/2008 | Lee | |
| 2008/0178025 A1 * | 7/2008 | Hand et al. | 713/323 |
| 2008/0209157 A1 | 8/2008 | Weng | |
| 2008/0222491 A1 | 9/2008 | Lee et al. | |
| 2008/0235467 A1 | 9/2008 | Tagawa | |
| 2008/0288814 A1 | 11/2008 | Kitahara | |
| 2008/0294814 A1 | 11/2008 | Gorobets | |
| 2008/0301349 A1 | 12/2008 | Bacha | |
| 2008/0301381 A1 | 12/2008 | Lee et al. | |
| 2008/0320214 A1 | 12/2008 | Ma et al. | |
| 2009/0006720 A1 | 1/2009 | Traister | |
| 2009/0037652 A1 | 2/2009 | Yu et al. | |
| 2009/0044078 A1 | 2/2009 | Vogan et al. | |
| 2009/0055590 A1 | 2/2009 | Takahashi et al. | |
| 2009/0063895 A1 * | 3/2009 | Smith | 714/7 |
| 2009/0063923 A1 | 3/2009 | Gower et al. | |
| 2009/0063934 A1 | 3/2009 | Jo | |
| 2009/0119443 A1 | 5/2009 | Tremaine | |
| 2009/0125785 A1 | 5/2009 | Gorobets et al. | |
| 2009/0125790 A1 | 5/2009 | Iyer et al. | |
| 2009/0164698 A1 | 6/2009 | Ji et al. | |
| 2009/0240873 A1 | 9/2009 | Yu et al. | |
| 2009/0265513 A1 | 10/2009 | Ryu | |
| 2010/0049914 A1 * | 2/2010 | Goodwin | 711/114 |
| 2010/0153660 A1 | 6/2010 | Lasser et al. | |
| 2010/0165562 A1 * | 7/2010 | Segaram | 361/679.31 |
| 2010/0211737 A1 | 8/2010 | Flynn et al. | |
| 2010/0262738 A1 | 10/2010 | Swing et al. | |
| 2010/0262740 A1 | 10/2010 | Borchers et al. | |

(56) References Cited

U.S. PATENT DOCUMENTS

| | | |
|---|---|---|
| 2010/0262757 A1 | 10/2010 | Sprinkle et al. |
| 2010/0262758 A1 | 10/2010 | Swing et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0269015 A1 | 10/2010 | Borchers et al. |
| 2010/0287217 A1 | 11/2010 | Borchers et al. |
| 2011/0191554 A1 | 8/2011 | Sakai |
| 2011/0213921 A1 | 9/2011 | Yu et al. |
| 2011/0238885 A1 | 9/2011 | Kitahara et al. |
| 2012/0030416 A1 | 2/2012 | Borchers et al. |
| 2012/0030507 A1 | 2/2012 | Borchers et al. |
| 2012/0030542 A1 | 2/2012 | Borchers et al. |

FOREIGN PATENT DOCUMENTS

| | | |
|---|---|---|
| JP | 2008-293096 A | 12/2008 |
| WO | 01/33852 A1 | 5/2001 |
| WO | 01/90900 A1 | 11/2001 |
| WO | 02/03388 A2 | 1/2002 |
| WO | 02/11424 A2 | 2/2002 |
| WO | 02/058383 A1 | 7/2002 |
| WO | 2005/081097 A2 | 9/2005 |
| WO | 2005/093588 A2 | 10/2005 |
| WO | 2005/093588 A3 | 10/2005 |
| WO | 2005/081097 A3 | 11/2005 |
| WO | 2007/072313 A2 | 6/2007 |
| WO | 2007/072317 A2 | 6/2007 |
| WO | 2007/072317 A3 | 6/2007 |
| WO | 2007/096844 A1 | 8/2007 |
| WO | 2007/096844 A3 | 8/2007 |
| WO | 2007/146756 A2 | 12/2007 |
| WO | 2007/146845 A2 | 12/2007 |
| WO | 2008/022094 A2 | 2/2008 |
| WO | 2008040028 A2 | 4/2008 |
| WO | 2008/025238 A1 | 6/2008 |
| WO | 2008/147752 A1 | 12/2008 |
| WO | 2009032743 A2 | 3/2009 |
| WO | 2010/117877 A1 | 10/2010 |
| WO | 2010/117878 A1 | 10/2010 |

OTHER PUBLICATIONS

Non-Final Office Action Response for U.S. Appl. No. 12/537,727, filed Mar. 14, 2011, 11 pages.
Non Final Office Action for U.S. Appl. No. 12/537,727, mailed on Dec. 13, 2010, 20 pages.
International Search Report and Written Opinion received for PCT Application No. PCT/US2010/029677, mailed on Jul. 5, 2010, 13 pages.
International Search Report and Written Opinion received for PCT Application No. PCT/US2010/029679, mailed on Jul. 5, 2010, 20 pages.
International Search Report and Written Opinion received for PCT Application No. PCT/US2010/029916, mailed on Jul. 7, 2010, 14 pages.
International Search Report and Written Opinion received for PCT Application No. PCT/US2010/029917, mailed on Jul. 28, 2010, 19 pages.
International Search Report and Written Opinion received for PCT Application No. PCT/US2010/029919, mailed on Jul. 28, 2010, 11 pages.
International Search Report and Written Opinion received for PCT Application No. PCT/US2010/030389, mailed on Jul. 21, 2010, 11 pages.
U.S. Appl. No. 12/537,733, filed Aug. 7, 2009.
U.S. Appl. No. 12/537,727, filed Aug. 7, 2009.
U.S. Appl. No. 12/537,725, filed Aug. 7, 2009.
U.S. Appl. No. 12/537,722, filed Aug. 7, 2009.
U.S. Appl. No. 12/537,719, filed Aug. 7, 2009.
U.S. Appl. No. 12/756,009, filed Apr. 7, 2010, 35 pages.
U.S. Appl. No. 12/537,709, filed Aug. 7, 2009.
U.S. Appl. No. 12/755,968, filed Apr. 7, 2010, 41 pages.
U.S. Appl. No. 12/755,964, filed Apr. 7, 2010, 44 pages.
U.S. Appl. No. 12/756,007, filed Apr. 7, 2010, 54 pages.
U.S. Appl. No. 12/756,477, filed Apr. 8, 2010, 51 pages.
U.S. Appl. No. 12/537,748, filed Aug. 7, 2009.
U.S. Appl. No. 12/537,738, filed Aug. 7, 2009.
Non-Final Office Action for U.S. Appl. No. 12/755,968, mailed Jan. 26, 2012, 32 pages.
Non-Final Office Action for U.S. Appl. No. 13/269,985, mailed Jan. 6, 2012, 24 pages.
Non-Final Office Action for U.S. Appl. No. 12/537,709, mailed Dec. 19, 2011, 28 pages.
Non-Final Office Action for U.S. Appl. No. 12/537,704, mailed Nov. 28, 2011, 24 pages.
Non-Final Office Action for U.S. Appl. No. 12/537,722, mailed Dec. 29, 2011, 25 pages.
Non-Final Office Action Response for U.S. Appl. No. 12/537,727, filed Aug. 31, 2011, 15 pages.
Final Office Action for U.S. Appl. No. 12/537,727, mailed Nov. 8, 2011, 13 pages.
Non-Final Office Action for U.S. Appl. No. 12/537,741, mailed Dec. 21, 2011, 25 pages.
Non-Final Office Action for U.S. Appl. No. 12/537,738, mailed Dec. 12, 2011, 25 pages.
Non-Final Office Action for U.S. Appl. No. 13/269,183, mailed Dec. 27, 2011, 27 pages.
Non-Final Office Action for U.S. Appl. No. 13/269,972, mailed Jan. 5, 2012, 26 pages.
Non-Final Office Action for U.S. Appl. No. 12/537,725, mailed Jan. 30, 2012, 33 pages.
Non-Final Office Action for U.S. Appl. No. 12/537,748, mailed Dec. 12, 2011, 24 pages.
Paris, et al, "Evaluating the Impact of Irrecoverable Read Errors on Disk Array Reliability", 15th IEEE Pacific Rim International Symposium on Dependable Computing, Nov. 16-18, 2009, 6 pages.
Takeuchi, "Novel Co-Design of NAND Flash Memory and NAND Flash Controller Circuits for Sub-30 nm Low-Power High-Speed Solid-State Drives (SSD)", IEEE Journal of Solid-State Circuits, vol. 44, No. 4, Apr. 2009, pp. 1227-1234.
Wen, et al, "A Processor-DMA-Based Memory Copy Hardware Accelerator", 6th IEEE International Conference on Networking, Architecture and Storage (NAS), Jul. 30, 2011, pp. 225-229.
Non-Final Office Action Response for U.S. Appl. No. 12/537,704, filed Jul. 5, 2012, 16 pages.
Final Office Action for U.S. Appl. No. 12/537,733, mailed Jul. 9, 2012, 22 pages.
Non-Final Office Action Response for U.S. Appl. No. 12/537,733, filed Jun. 14, 2012, 10 pages.
Non-Final Office Action for U.S. Appl. No. 12/756,477, mailed Jul. 19, 2012, 38 pages.
Final Office Action for U.S. Appl. No. 12/537,748, mailed Jul. 9, 2012, 22 pages.
Non-Final Office Action Response for U.S. Appl. No. 13/269,985, filed Sep. 6, 2012, 10 pages.
"Information Technology—AT Attachment 8—ATA/ATAPI Command Set (ATA8-ACS)", Working Draft Project, American National T13/1699-0 Standard, Revision 4a, May 21, 2007, 462 pages.
Notice of Allowance for U.S. Appl. No. 12/537,733, mailed Nov. 27, 2012, 11 pages.
RCE and Response for U.S. Appl. No. 12/537,733, filed Oct. 9, 2012, 12 pages.
RCE and Response for U.S. Appl. No. 12/537,741, filed Oct. 4, 2012, 17 pages.
RCE and Response for U.S. Appl. No. 12/537,748, filed Oct. 4, 2012, 16 pages.
Office Action for U.S. Appl. No. 12/755,964, mailed Sep. 10, 2012, 31 pages.

(56) References Cited

OTHER PUBLICATIONS

Non-Final Office Action for U.S. Appl. No. 12/756,009, mailed Sep. 11, 2012, 31 pages.
Non-Final Office Action Response for U.S. Appl. No. 12/756,009, filed Dec. 10, 2012, 7 pages.
Notice of Allowance for U.S. Appl. No. 13/269,985, mailed Oct. 16, 2012, 16 pages.
Office Action for AU Application No. 2010234772, mailed Oct. 31, 2012, 3 pages.
Office Action for AU Application No. 2010234773, mailed Oct. 31, 2012, 4 pages.
Notice of Allowance for U.S. Appl. No. 12/755,964, mailed Jan. 29, 2013, 7 pages.
Non-Final Office Action for U.S. Appl. No. 12/756,007, mailed Feb. 28, 2013, 10 pages.
Final Office Action Response for U.S. Appl. No. 12/756,477, filed Jan. 17, 2013, 10 pages.
Ex Parte Quayle Action Response for U.S. Appl. No. 12/537,704, filed Jan. 4, 2013, 8 pages.
Notice of Allowance for U.S. Appl. No. 12/756,009, mailed Jan. 11, 2013, 6 pages.
Notice of Allowance for U.S. Appl. No. 12/537,722, mailed May 11, 2012, 14 pages.
Notice of Allowance for U.S. Appl. No. 12/537,727, mailed Apr. 24, 2012, 14 pages.
Non-Final Office Action for U.S. Appl. No. 13/269,985, mailed Jun. 6, 2012, 19 pages.
Non-Final Office Action Response for U.S. Appl. No. 13/269,985, filed Apr. 4, 2012, 15 pages.
Non-Final Office Action Response for U.S. Appl. No. 12/537,725, filed Apr. 27, 2012, 12 pages.
Non-Final Office Action Response for U.S. Appl. No. 12/537,748, filed May 2, 2012, 13 pages.
Notice of Allowance for U.S. Appl. No. 12/537,725, mailed May 21, 2012, 18 pages.
Notice of Allowance for U.S. Appl. No. 13/269,183, mailed Apr. 19, 2012, 15 pages.
Notice of Allowance for U.S. Appl. No. 12/537,709, mailed Apr. 6, 2012, 14 pages.
Final Office Action for U.S. Appl. No. 12/537,704, mailed Apr. 6, 2012, 15 pages.
Non-Final Office Action Response for U.S. Appl. No. 12/537,722, filed Apr. 19, 2012, 12 pages.
Non-Final Office Action Response for U.S. Appl. No. 13/269,183, filed Mar. 27, 2012, 17 pages.
Non-Final Office Action Response for U.S. Appl. No. 12/537,709, filed Mar. 19, 2012, 15 pages.
Final Office Action for U.S. Appl. No. 12/537,741, mailed Jul. 6, 2012, 22 pages.
Non-Final Office Action Response for U.S. Appl. No. 12/537,727, filed Mar. 8, 2012, 11 pages.
Non-Final Office Action for U.S. Appl. No. 12/537,733, mailed Mar. 14, 2012, 23 pages.
Notice of Allowance for U.S. Appl. No. 13/269,972, mailed May 23, 2012, 18 pages.
Non-Final Office Action Response for U.S. Appl. No. 13/269,972, filed Apr. 4, 2012, 15 pages.
Non-Final Office Action Response for U.S. Appl. No. 12/537,704, filed Feb. 28, 2012, 16 pages.
Non-Final Office Action for U.S. Appl. No. 12/537,741, mailed Jul. 10, 2013, 6 pages.
Notice of Allowance for U.S. Appl. No. 12/537,748, mailed Jul. 9, 2013, 7 pages.
Notice of Allowance for U.S. Appl. No. 12/756,007, mailed on Jul. 24, 2013, 6 pages.
Office Action for JP Application No. 2012-504716 (with English Translation), mailed Jul. 9, 2013, 6 pages.

* cited by examiner

DATA STORAGE DEVICE HAVING MULTIPLE REMOVABLE MEMORY BOARDS

CROSS REFERENCE TO RELATED APPLICATIONS

This application claims the benefit of U.S. Provisional Application No. 61/167,709, filed Apr. 8, 2009, and titled "Data Storage Device" and U.S. Provisional Application No. 61/187,835, filed Jun. 17, 2009, and titled "Partitioning and Striping in a Flash Memory Data Storage Device," both of which are hereby incorporated by reference in entirety.

TECHNICAL FIELD

This description relates to a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

SUMMARY

This document describes a data storage device that includes one or more memory boards, where each of the memory boards includes multiple flash memory chips. The data storage device includes a controller board to which the memory boards operably connect. The data storage device may be configured to communicate with a host using an interface to receive commands from the host and to process those commands using the flash memory chips. For example, the host may send and the controller board may receive commands to read, write, copy and erase blocks of data using the flash memory chips.

In one exemplary implementation, the controller includes a field-programmable gate array (FPGA) controller and the interface between the host and the controller board may be a high speed interface such as, for example, a peripheral component interconnect express (PCIe) interface. In this manner, the data storage device may include high storage volumes and may be configured to achieve high performance and high speeds of data transfer between the host and the flash memory chips.

In one exemplary implementation, the data storage device may be configured with two memory boards with each of the memory boards including multiple flash memory chips. The data storage device, including the controller board and two memory boards, may be configured in a disk drive form such that the data storage device fits in an on-board drive slot of a computing device. For instance, the data storage device may be configured to fit in an on-board drive slot of a server to provide data storage capacity for the server. The data storage device may be configured to be removable such that it may be removed easily from the computing device and inserted in the on-board drive slot of a different computing device.

Also, the data storage device may be modular such that the memory boards may be disconnected from the controller board and replaced with other memory boards, where the other memory boards also may include multiple flash memory chips. The controller on the controller board may be configurable to recognize that one or more of the memory boards have been disconnected and replaced with other memory boards. The controller may be configured to recognize this type of swap-out of memory boards and may process commands between the host and the other memory boards. In this manner, the controller board may continue to be used even if one or more of the memory boards are no longer usable. An unusable memory board may be disconnected from the controller board and may be replaced by another memory board while still using the same controller board and the same components on the controller board.

In one exemplary implementation, the data storage device may be configurable to handle different types of flash memory chips. For example, the controller on the controller board may be configured to recognize and to operate with different types of flash memory chips on the memory boards. For instance, the controller may be a FPGA controller that is configured to recognize different types of flash memory chips including, for example, single-level cell (SLC) flash memory chips, multi-level cell (MLC) flash memory chips, NAND flash memory chips, NOR flash memory chips, and other types of flash memory chips. The controller may be configured to recognize flash memory chips from different flash memory chip vendors. The controller may be configured to recognize the different types of flash memory chips and to execute commands from the host using the flash memory chips by translating the commands based on the type of flash memory chips on the memory boards. Thus, the host is not required to translate the commands or to send different commands because of the type of flash memory chip. The controller may be configured to translate the commands from the host to the native commands for the particular type of flash memory chips.

In this manner, the same controller board having the same controller may be used with memory boards having different types of flash memory chips. For instance, a first memory board and a second memory board may be connected to the controller board and each of the boards may include SLC NAND flash memory chips manufactured by a one vendor. The first memory board and the second memory board may be disconnected and replaced with two other memory boards, where the other memory boards include MLC NAND flash memory chips manufactured by a different vendor. The controller may be configured to automatically recognize the flash memory chips on the other memory boards and to execute commands from the host using the flash memory chips on the other memory boards. In this manner, the data storage device may be tailored and configured with different flash memory chips on the memory boards depending on the characteristics of the application or applications on the host and depending on the desired features of the data storage device by the application or applications on the host.

In other exemplary implementations, each of the memory boards may include memory devices other than flash memory chips. For example, each of the memory boards may include multiple dynamic random access memory (DRAM) chips. In the same manner as described above with respect to the flash memory chips, the data storage device may be configurable to handle different types of DRAM chips. For example, the controller on the controller board may be configured to recognize and to operate with different types of DRAM chips on the memory boards. One memory board of DRAM chips may be removed from the data storage device and replace with a memory board having a different type of DRAM chips. The controller may execute commands from the host using the different type of DRAM chips by translating the commands based on the type of DRAM chips on the memory board. In other exemplary implementations, the memory boards may include other types of memory devices including, for example, phase change memory (PCM) chips and other types of memory devices.

In another exemplary implementation, the controller on the controller board may be configured to recognize and to operate with one type of memory device on the one memory board and, at the same time, operate with a different type of memory device on the other memory board. For example, one of the memory boards may include flash memory chips and another memory board may include DRAM chips.

In one exemplary implementation, the data storage device may be configurable to handle flash memory chips having different voltages. For example, the controller on the controller board may be configured to recognize and to operate with flash memory chips having different voltages on the memory boards. For instance, the controller may sense the voltage of the flash memory chips and configure power control circuitry to supply the required voltage. For instance, the controller may be a FPGA controller that is configured to sense the voltage of the flash memory chips on the memory board and to configure a power module on the controller board to supply the appropriate voltage to the flash memory chips based on the sensed voltage. The controller may be configured to sense the voltage of the flash memory chips and to execute commands from the host using the flash memory chips without having to translate the commands based on the voltage of flash memory chips on the memory boards.

In this manner, the same controller board having the same controller may be used with memory boards having flash memory chips with different voltages. For instance, a first memory board and a second memory board may be connected to the controller board and each of the boards may include flash memory chips that operate at a first voltage. The first memory board and the second memory board may be disconnected and replaced with two other memory boards, where the other memory boards include flash memory chips that operate at a second voltage, where the second voltage differs from the first voltage. The controller may be configured to automatically sense the second voltage of the flash memory chips on the other memory boards, to configure the power module to operate at the second voltage and to execute commands from the host using the flash memory chips on the other memory boards. In this manner, the data storage device, may be tailored and configured with different flash memory chips on the other memory boards depending on the characteristics of the application or applications on the host and depending on the desired features of the data storage device by the application or applications on the host.

The use of a single controller board having a single controller that is on a separate board from the flash memory chips, which are on the memory boards, enables flexibility in configuring the data storage device. For instance, the use of a single controller board having a single controller on the board that is configured to recognize and operate with different types of flash memory chips and/or recognize and operate with flash memory chips having different voltages enables the data storage device to be designed using different flash memory chip technologies. Also, a particular flash memory chip technology may be selected and used on the memory boards based on the type of application on the host that will be interfacing with the data storage device. Also, as flash memory chip technologies may change, the same controller board and controller may be used with the different flash memory chips on the memory boards by swapping out the memory boards. In this manner, the controller board having the controller and other components may be considered a universal controller board and controller that are configurable to accept multiple different types of flash memory chips on the memory boards.

According to one general aspect, data storage device may include a first memory board and a second memory board, where the first memory board and the second memory board each comprise multiple memory chips. The data storage device may include a controller board that is arranged and configured to operably connect to the first memory board and the second memory board, where the controller board includes a high speed interface and a controller that is arranged and configured to receive commands from a host using the high speed interface and to execute the commands, where the first memory board and the second memory board are each separately removable from the controller board.

Implementations may include one or more of the following features. For example, the controller may be a field programmable gate array (FPGA) controller. The memory chips may include flash memory chips. The flash memory chips may include single-level cell (SLC) NAND flash memory chips and/or multi-level cell (MLC) NAND flash memory chips. The high speed interface may include a PCI-e interface. In one exemplary implementation, the flash memory chips may include NAND flash memory chips, the high speed interface may be a PCI-e interface and the controller may be a field programmable gate array (FPGA).

The first memory board, the second memory board and the controller board may be arranged and configured to fit in a drive bay of a server. The first memory board may be operably connected to a top side of the controller board and the second memory board may be operably connected to bottom side of the controller board.

In one exemplary implementation, the memory chips may include dynamic random access memory (DRAM) chips. In another exemplary implementation, the memory chips comprise phase change memory (PCM) chips.

The first memory board and the second memory board may be modular boards that are arranged and configured to be removed and replaced by another memory board including multiple memory chips. The controller may include a power module and may be arranged and configured to control command processing for multiple memory chips having different voltages, automatically recognize a voltage of the memory chips on the first memory board and the second memory board, configure the power module to operate at the recognized voltage of the memory chips, receive commands from the host using the interface and execute the commands using the memory chips.

The controller may be arranged and configured to control command processing for multiple different types of memory chips, automatically recognize a type of the memory chips on the first memory board and the second memory board, receive commands from the host using the interface and execute the commands using the memory chips.

The controller may include multiple channels, where each of the channels is associated with one or more of the memory chips and each of the memory chips is associated with one of the channels. The controller may include a channel controller for each of the channels.

In another general aspect, a computing device may include a host and a data storage device. The data storage device may include a first memory board, a second memory board, where the first memory board and the second memory board each comprise multiple memory chips, and a controller board that is arranged and configured to operably connect to the first memory board and the second memory board. The controller board may include a high speed interface and a controller that is arranged and configured to receive commands from the host using the high speed interface and to execute the commands, where the first memory board and the second memory board are each separately removable from the controller board. Implementations may include one or more of the features discussed above and below.

In another general aspect, a method for assembling a data storage device may include securing multiple memory chips to a first memory board, securing multiple memory chips to a second memory board, attaching a high speed interface and a controller to a controller board, operably connecting the first memory board to the controller board and operably connecting the second memory board to the controller board, wherein the first memory board and the second memory board are each separately removable from the controller board.

Implementations may include one or more of the following features. For example, the method may further include securing multiple memory chips to a third memory board, disconnecting one of the first memory board or the second memory board from the controller board and operably connecting the third memory board to the controller board. Operably connecting the first memory board to the controller board and operably connecting the second memory board to the controller board may include forming a drive bay form factor of the first memory board, the second memory board and the controller board such that the drive bay form factor is configured to fit in a drive bay of a server. Operably connecting the first memory board to the controller board may include operably connecting the first memory board to a top side of the controller board and operably connecting the second memory board to the controller board may include operably connecting the second memory board to a bottom side of the controller board.

In one implementation, the memory chips may include dynamic random access memory (DRAM) chips. In another implementation, the memory chips may include phase change memory (PCM) chips. In another implementation, the memory chips may include flash memory chips. The flash memory chips on the first memory board and the second memory may include NAND flash memory chips, the high speed interface may be a PCI-e interface and the controller may be a field programmable gate array (FPGA) controller.

The details of one or more implementations are set forth in the accompanying drawings and the description below. Other features will be apparent from the description and drawings, and from the claims.

DETAILED DESCRIPTION

This document describes an apparatus, system(s) and techniques for data storage. Such a data storage apparatus may include a controller board having a controller that may be used with one or more different memory boards, with each of the memory boards having multiple flash memory chips. The data storage apparatus may communicate with a host using an interface on the controller board. In this manner, the controller on the controller board may be configured to receive commands from the host using the interface and to execute those commands using the flash memory chips on the memory boards.

Figure 1:
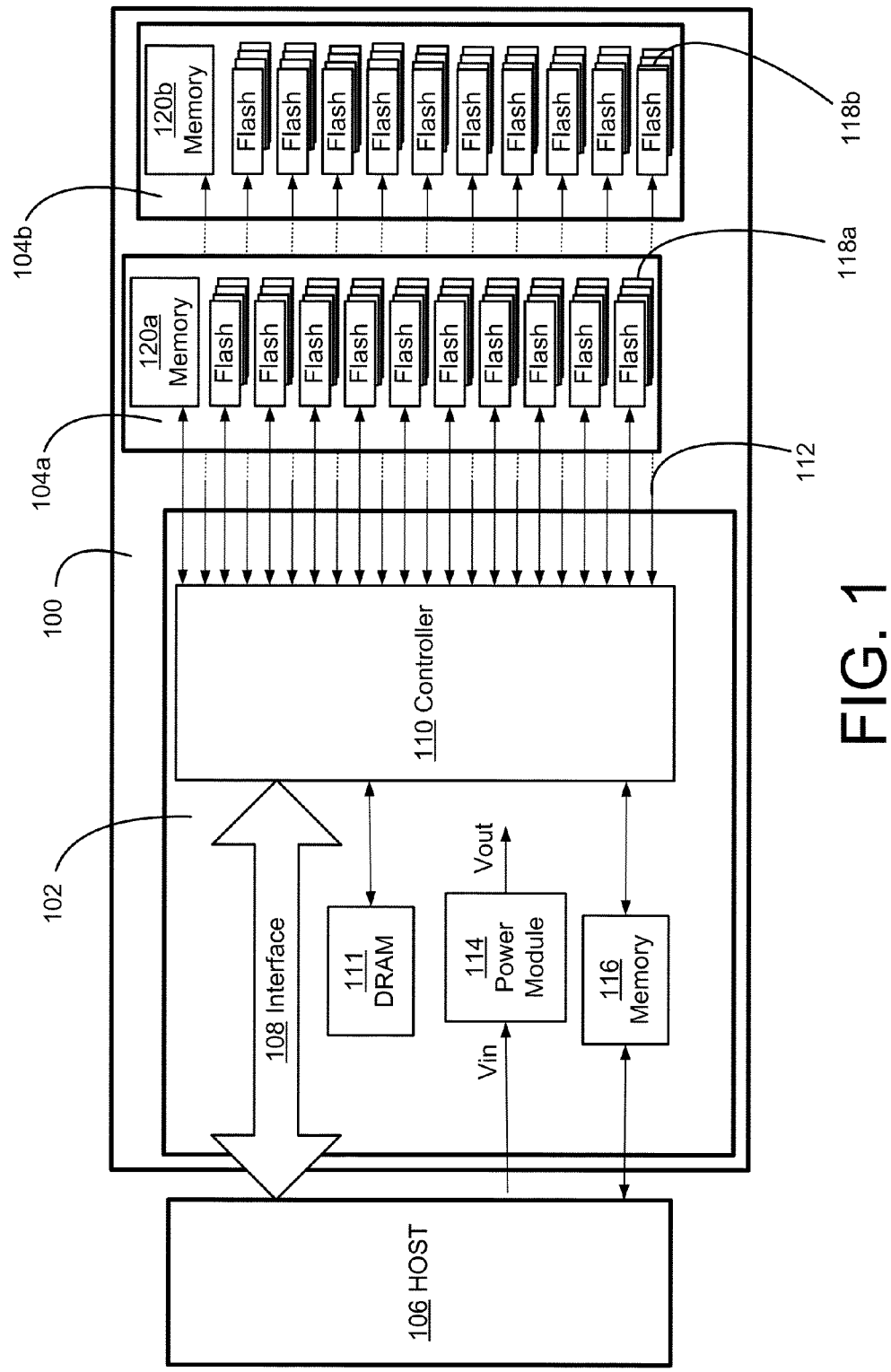
FIG. 1 is an exemplary block diagram of a data storage device.

FIG. 1 is a block diagram of a data storage device 100. The data storage device 100 may include a controller board 102 and one or more memory boards 104a and 104b. The data storage device 100 may communicate with a host 106 over an interface 108. The interface 108 may be between the host 106 and the controller board 102. The controller board 102 may include a controller 110, a DRAM 111, multiple channels 112, a power module 114, and a memory module 116. The memory boards 104a and 104b may include multiple flash memory chips 118a and 118b on each of the memory boards. The memory boards 104a and 104b also may include a memory device 120a and 120b.

In general, the data storage device 100 may be configured to store data on the flash memory chips 118a and 118b. The host 106 may write data to and read data from the flash memory chips 118a and 118b, as well as cause other operations to be performed with respect to the flash memory chips 118a and 118b. The reading and writing of data between the host 106 and the flash memory chips 118a and 118b, as well as the other operations, may be processed through and controlled by the controller 110 on the controller board 102. The controller 110 may receive commands from the host 106 and cause those commands to be executed using the flash memory chips 118a and 118b on the memory boards 104a and 104b. The communication between the host 106 and the controller 110 may be through the interface 108. The controller 110 may communicate with the flash memory chips 118a and 118b using the channels 112.

The controller board 102 may include DRAM 111. The DRAM 111 may be operably coupled to the controller 110 and may be used to store information. For example, the DRAM 111 may be used to store logical address to physical address maps and bad block information. The DRAM 111 also may be configured to function as a buffer between the host 106 and the flash memory chips 118a and 118b.

In one exemplary implementation, the controller board 102 and each of the memory boards 104a and 104b are physically separate printed circuit boards (PCBs). The memory board 104a may be on one PCB that is operably connected to the controller board 102 PCB. For example, the memory board 104a may be physically and/or electrically connected to the controller board 102. Similarly, the memory board 104b may be a separate PCB from the memory board 104a and may be operably connected to the controller board 102 PCB. For example, the memory board 104b may be physically and/or electrically connected to the controller board 102. The memory boards 104a and 104b each may be separately disconnected and removable from the controller board 102. For example, the memory board 104a may be disconnected from the controller board 102 and replaced with another memory board (not shown), where the other memory board is operably connected to controller board 102. In this example, either or both of the memory boards 104a and 104b may be swapped out with other memory boards such that the other memory boards may operate with the same controller board 102 and controller 110.

In one exemplary implementation, the controller board 102 and each of the memory boards 104a and 104b may be physically connected in a disk drive form factor. The disk drive form factor may include different sizes such as, for example, a 3.5" disk drive form factor and a 2.5" disk drive form factor.

In one exemplary implementation, the controller board 102 and each of the memory board 104a and 104b may be electrically connected using a high density ball grid array (BGA) connector. Other variants of BGA connectors may be used including, for example, a fine ball grid array (FBGA) connector, an ultra fine ball grid array (UBGA) connector and a micro ball grid array (MBGA) connector. Other types of electrical connection means also may be used.

Figure 2:
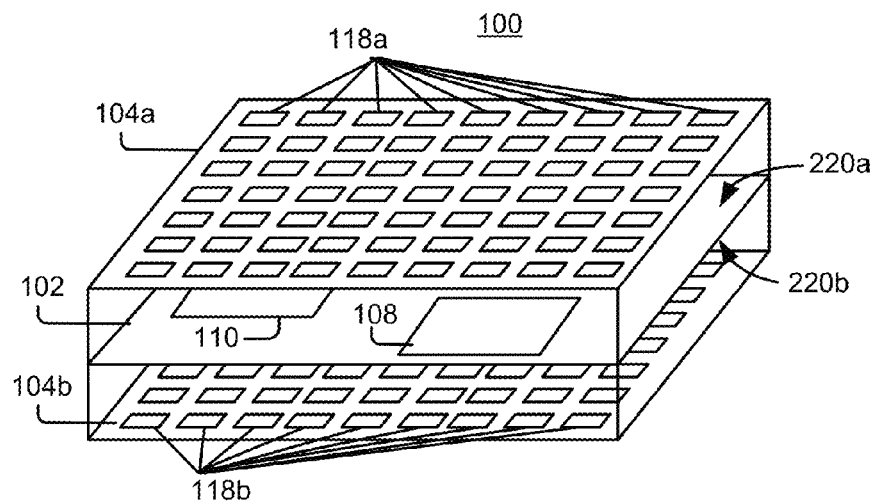
FIG. 2 is an exemplary perspective block diagram of the printed circuit boards of the data storage device.

In one exemplary implementation, the controller board 102, which is its own PCB, may be located physically between each of the memory boards 104a and 104b, which are on their own separate PCBs. Referring also to FIG. 2, the data storage device 100 may include the memory board 104a on one PCB, the controller board 102 on a second PCB, and the memory board 104b on a third PCB. The memory board 104a includes multiple flash memory chips 118a and the memory board 104b includes multiple flash memory chips 118b. The controller board 102 includes the controller 110 and the interface 108 to the host (not shown), as well as other components (not shown).

In the example illustrated by FIG. 2, the memory board 104a may be operably connected to the controller board 102 and located on one side 220a of the controller board 102. For instance, the memory board 104a may be connected to a top side 220a of the controller board 102. The memory board 104b may be operably connected to the controller board 102 and located on a second side 220b of the controller board 102. For instance, the memory board 104b may be connected to a bottom side 220b of the controller board 102.

Other physical and/or electrical connection arrangements between the memory boards 104a and 104b and the controller board 102 are possible. FIG. 2 merely illustrates one exemplary arrangement. For example, the data storage device 100 may include more than two memory board such as three memory boards, four memory boards or more memory boards, where all of the memory boards are connected to a single controller board. In this manner, the data storage device may still be configured in a disk drive form factor. Also, the memory boards may be connected to the controller board in other arrangements such as, for instance, the controller board on the top and the memory cards on the bottom or the controller board on the bottom and the memory cards on the top.

Figure 3:
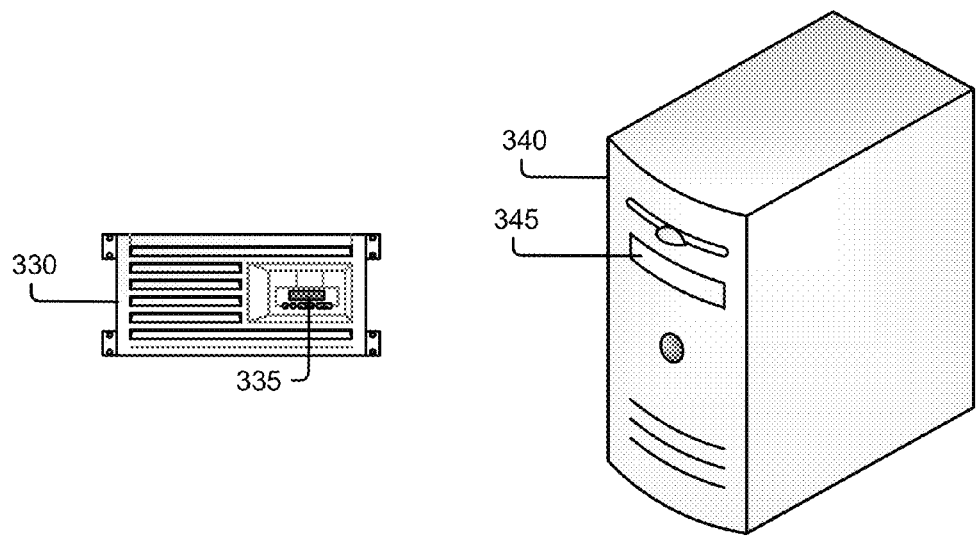
FIG. 3 is an exemplary block diagram of exemplary computing devices for use with the data storage device of FIG. 1.

The data storage device 100 may be arranged and configured to cooperate with a computing device. In one exemplary implementation, the controller board 102 and the memory boards 104a and 104b may be arranged and configured to fit within a drive bay of a computing device. Referring to FIG. 3, two exemplary computing devices are illustrated, namely a server 330 and a server 340. The servers 330 and 340 may be arranged and configured to provide various different types of computing services. The servers 330 and 340 may include a host (e.g., host 106 of FIG. 1) that includes computer program products having instructions that cause one or more processors in the servers 330 and 340 to provide computing services. The type of server may be dependent on one or more application programs that are operating on the server. For instance, the servers 330 and 340 may be application servers, web servers, email servers, search servers, streaming media servers, e-commerce servers, file transfer protocol (FTP) servers, other types of servers or combinations of these servers. The server 330 may be configured to be a rack-mounted server that operates within a server rack. The server 340 may be configured to be a stand-alone server that operates independent of a server rack. Even though the server 340 is not within a server rack, it may be configured to operate with other servers and may be operably connected to other servers. Servers 330 and 340 are meant to illustrate example computing devices and other computing devices, including other types of servers, may be used.

In one exemplary implementation, the data storage device 100 of FIGS. 1 and 2 may be sized to fit within a drive bay 335 of the server 330 of the drive bay 345 of the server 340 to provide data storage functionality for the servers 330 and 340. For instance, the data storage device 100 may be sized to a 3.5" disk drive form factor to fit in the drive bays 335 and 345. The data storage device 100 also may be configured to other sizes. The data storage device 100 may operably connect and communicate with the servers 330 and 340 using the interface 108. In this manner, the host may communicate commands to the controller board 102 using the interface 108 and the controller 110 may execute the commands using the flash memory chips 118a and 118b on the memory boards 104a and 104b.

Referring back to FIG. 1, the interface 108 may include a high speed interface between the controller 110 and the host 106. The high speed interface may enable for fast transfers of data between the host 106 and the flash memory chips 118a and 118b. In one exemplary implementation, the high speed interface may include a PCIe interface. For instance, the PCIe interface may be a PCIe x4 interface or a PCIe x8 interface. The PCIe interface 108 may include a PCIe connector cable assembly to the host 106. Other high speed interfaces, connectors and connector assemblies also may be used.

In one exemplary implementation, the communication between the controller board 102 and the flash memory chips 118a and 118b on the memory boards 104a and 104b may be arranged and configured into multiple channels 112. Each of the channels 112 may communicate with one or more flash memory chips 118a and 118b. The controller 110 may be configured such that commands received from the host 106 may be executed by the controller 110 using each of the channels 112 simultaneously or at least substantially simultaneously. In this manner, multiple commands may be executed simultaneously on different channels 112, which may improve throughput of the data storage device 100.

In the example of FIG. 1, twenty (20) channels 112 are illustrated. The completely solid lines illustrate the ten (10) channels between the controller 110 and the flash memory chips 118a on the memory board 104a. The mixed solid and dashed lines illustrate the ten (10) channels between the controller 110 and the flash memory chips 118b on the memory board 104b. As illustrated in FIG. 1, each of the channels 112 may support multiple flash memory chips. For instance, each of the channels 112 may support up to 32 flash memory chips. In one exemplary implementation, each of the 20 channels may be configured to support and communicate with 6 flash memory chips. In this example, each of the memory boards 104a and 104b would include 60 flash memory chips each. Depending on the type and the number of the flash memory chips 118a and 118b, the data storage 100 device may be configured to store up to and including multiple terabytes of data.

The controller 110 may include a microcontroller, a FPGA controller, other types of controllers, or combinations of these controllers. In one exemplary implementation, the controller 110 is a microcontroller. The microcontroller may be implemented in hardware, software, or a combination of hardware and software. For example, the microcontroller may be loaded with a computer program product from memory (e.g., memory module 116) including instructions that, when executed, may cause the microcontroller to perform in a certain manner. The microcontroller may be configured to receive commands from the host 106 using the interface 108 and to execute the commands. For instance, the commands may include commands to read, write, copy and erase blocks of data using the flash memory chips 118*a* and 118*b*, as well as other commands.

In another exemplary implementation, the controller 110 is a FPGA controller. The FPGA controller may be implemented in hardware, software, or a combination of hardware and software. For example, the FPGA controller may be loaded with firmware from memory (e.g., memory module 116) including instructions that, when executed, may cause the FPGA controller to perform in a certain manner. The FPGA controller may be configured to receive commands from the host 106 using the interface 108 and to execute the commands. For instance, the commands may include commands to read, write, copy and erase blocks of data using the flash memory chips 118*a* and 118*b*, as well as other commands.

In one exemplary implementation, the FPGA controller may support multiple interfaces 108 with the host 106. For instance, the FPGA controller may be configured to support multiple PCIe x4 or PCIe x8 interfaces with the host 106.

The memory module 116 may be configured to store data, which may be loaded to the controller 110. For instance, the memory module 116 may be configured to store one or more images for the FPGA controller, where the images include firmware for use by the FPGA controller. The memory module 116 may interface with the host 106 to communicate with the host 106. The memory module 116 may interface directly with the host 106 and/or may interface indirectly with the host 106 through the controller 110. For example, the host 106 may communicate one or more images of firmware to the memory module 116 for storage. In one exemplary implementation, the memory module 116 includes an electrically erasable programmable read-only memory (EEPROM). The memory module 116 also may include other types of memory modules.

The power module 114 may be configured to receive power (Vin), to perform any conversions of the received power and to output an output power (Vout). The power module 114 may receive power (Vin) from the host 106 or from another source. The power module 114 may provide power (Vout) to the controller board 102 and the components on the controller board 102, including the controller 110. The power module 114 also may provide power (Vout) to the memory boards 104*a* and 104*b* and the components on the memory boards 104*a* and 104*b*, including the flash memory chips 118*a* and 118*b*.

In one exemplary implementation, the power module 114 may include one or more direct current (DC) to DC converters. The DC to DC converters may be configured to receive a power in (Vin) and to convert the power to one or more different voltage levels (Vout). For example, the power module 114 may be configured to receive +12 V (Vin) and to convert the power to 3.3 v, 1.2 v, or 1.8 v and to supply the power out (Vout) to the controller board 102 and to the memory boards 104*a* and 104*b*.

The memory boards 104*a* and 104*b* may be configured to handle different types of flash memory chips 118*a* and 118*b*. In one exemplary implementation, the flash memory chips 118*a* and the flash memory chips 118*b* may be the same type of flash memory chips including requiring the same voltage from the power module 114 and being from the same flash memory chip vendor. The terms vendor and manufacturer are used interchangeably throughout this document.

In another exemplary implementation, the flash memory chips 118*a* on the memory board 104*a* may be a different type of flash memory chip from the flash memory chips 118*b* on the memory board 104*b*. For example, the memory board 104*a* may include SLC NAND flash memory chips and the memory board 104*b* may include MLC NAND flash memory chips. In another example, the memory board 104*a* may include flash memory chips from one flash memory chip manufacturer and the memory board 104*b* may include flash memory chips from a different flash memory chip manufacturer. The flexibility to have all the same type of flash memory chips or to have different types of flash memory chips enables the data storage device 100 to be tailored to different applications being used by the host 106.

In another exemplary implementation, the memory boards 104*a* and 104*b* may include different types of flash memory chips on the same memory board. For example, the memory board 104*a* may include both SLC NAND chips and MLC NAND chips on the same PCB. Similarly, the memory board 104*b* may include both SLC NAND chips and MLC NAND chips. In this manner, the data storage device 100 may be advantageously tailored to meet the specifications of the host 106.

In another exemplary implementation, the memory board 104*a* and 104*b* may include other types of memory devices, including non-flash memory chips. For instance, the memory boards 104*a* and 104*b* may include random access memory (RAM) such as, for instance, dynamic RAM (DRAM) and static RAM (SRAM) as well as other types of RAM and other types of memory devices. In one exemplary implementation, the both of the memory boards 104*a* and 104*b* may include RAM. In another exemplary implementation, one of the memory boards may include RAM and the other memory board may include flash memory chips. Also, one of the memory boards may include both RAM and flash memory chips.

The memory modules 120*a* and 120*b* on the memory boards 104*a* and 104*b* may be used to store information related to the flash memory chips 118*a* and 118*b*, respectively. In one exemplary implementation, the memory modules 120*a* and 120*b* may store device characteristics of the flash memory chips. The device characteristics may include whether the chips are SLC chips or MLC chips, whether the chips are NAND or NOR chips, a number of chip selects, a number of blocks, a number of pages per block, a number of bytes per page and a speed of the chips.

In one exemplary implementation, the memory modules 120*a* and 120*b* may include serial EEPROMs. The EEPROMs may store the device characteristics. The device characteristics may be compiled once for any given type of flash memory chip and the appropriate EEPROM image may be generated with the device characteristics. When the memory boards 104*a* and 104*b* are operably connected to the controller board 102, then the device characteristics may be read from the EEPROMs such that the controller 110 may automatically recognize the types of flash memory chips 118*a* and 118*b* that the controller 110 is controlling. Additionally, the device characteristics may be used to configure the controller 110 to the appropriate parameters for the specific type or types of flash memory chips 118*a* and 118*b*.

Figure 4:
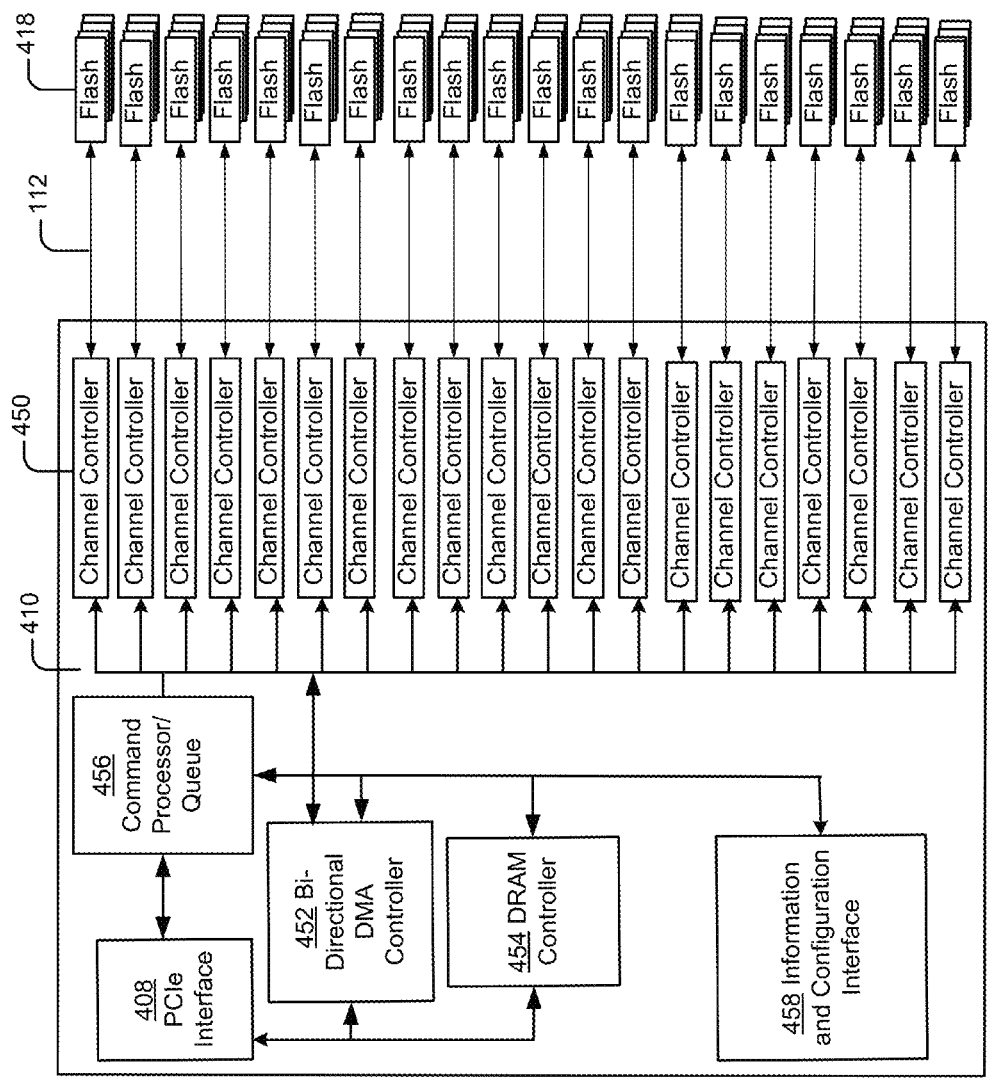
FIG. 4 is an exemplary block diagram of a controller.

As discussed above, the controller 110 may include a FPGA controller. Referring to FIG. 4, an exemplary block diagram of a FPGA controller 410 is illustrated. The FPGA controller may be configured to operate in the manner described above with respect to controller 110 of FIG. 1. The FPGA controller 410 may include multiple channel controllers 450 to connect the multiple channels 112 to the flash memory chips 418. The flash memory chips 418 are illustrated as multiple flash memory chips that connect to each of the channel controllers 450. The flash memory chips 418 are representative of the flash memory chips 118a and 118b of FIG. 1, which are on the separate memory boards 104a and 104b of FIG. 1. The separate memory boards are not shown in the example of FIG. 4. The FPGA controller 410 may include a PCIe interface module 408, a bi-directional direct memory access (DMA) controller 452, a dynamic random access memory (DRAM) controller 454, a command processor/queue 456 and an information and configuration interface module 458.

Information may be communicated with a host (e.g., host 106 of FIG. 1) using an interface. In this example, FIG. 4, the FPGA controller 410 includes a PCIe interface to communicate with the host and a PCIe interface module 408. The PCIe interface module 408 may be arranged and configured to receive commands from the host and to send commands to the host. The PCIe interface module 408 may provide data flow control between the host and the data storage device. The PCIe interface module 408 may enable high speed transfers of data between the host and the controller 410 and ultimately the flash memory chips 418. In one exemplary implementation, the PCIe interface and the PCIe interface module 408 may include a 64-bit bus.

The bi-directional DMA controller 452 may be configured to interface with the PCIe interface 408, the command processor/queue 456 and each of the channel controllers 450. The bi-directional DMA controller 452 enables bi-directional direct memory access between the host and the flash memory chips 418.

The DRAM controller 454 may be arranged and configured to control the translation of logical to physical addresses. For example, the DRAM controller 454 may assist the command processor/queue 456 with the translation of the logical addresses used by the host and the actual physical addresses in the flash memory chips 418 related to data being written to or read from the flash memory chips 418. A logical address received from the host may be translated to a physical address for a location in one of the flash memory chips 418. Similarly, a physical address for a location in one of the flash memory chips 418 may be translated to a logical address and communicated to the host.

The command processor/queue 456 may be arranged and configured to receive the commands from the host through the PCIe interface module 408 and to control the execution of the commands through the channel controllers 450. The command processor/queue 456 may maintain a queue for a number of commands to be executed. In this manner, multiple commands may be executed simultaneously and each of the channels 112 may be used simultaneously or at least substantially simultaneously.

The command processor/queue 456 may be configured to process commands for different channels 112 out of order and preserve per-channel command ordering. For instance, commands that are received from the host and that are designated for different channels may be processed out of order by the command processor/queue 456. In this manner, the channels may be kept busy. Commands that are received from the host for processing on the same channel may be processed in the order that the commands were received from the host by the command processor/queue 456. In one exemplary implementation, the command processor/queue 456 may be configured to maintain a list of commands received from the host in an oldest-first sorted list to ensure timely execution of the commands.

The channel controllers 450 may be arranged and configured to process commands from the command processor/queue 456. Each of the channel controllers 450 may be configured to process commands for multiple flash memory chips 418. In one exemplary implementation, each of the channel controllers 450 may be configured to process commands for up to and including 32 flash memory chips 418.

The channel controllers 450 may be configured to process the commands from the command processor/queue 456 in order as designated by the command processor/queue 456. Examples of the commands that may be processed include, but are not limited to, reading a flash page, programming a flash page, copying a flash page, erasing a flash block, reading a flash block's metadata, mapping a flash memory chip's bad blocks, and resetting a flash memory chip.

The information and configuration interface module 458 may be arranged and configured to interface with a memory module (e.g., memory module 116 of FIG. 1) to receive configuration information for the FPGA controller 410. For example, the information and configuration interface module 458 may receive one or more images from the memory module to provide firmware to the FPGA controller 410. Modifications to the images and to the firmware may be provided by the host to the controller 410 through the information and configuration interface module 458. Modifications received through the information and configuration interface module 458 may be applied to any of the components of the controller 410 including, for example, the PCIe interface module 408, the bi-directional DMA controller 452, the DRAM controller 454, the command processor/queue 456 and the channel controllers 450. The information and configuration interface module 458 may include one or more registers, which may be modified as necessary by instructions from the host.

The FPGA controller 410 may be arranged and configured to cooperate and process commands in conjunction with the host. The FPGA controller 410 may perform or at least assist in performing error correction, bad block management, logical to physical mapping, garbage collection, wear levelling, partitioning and low level formatting related to the flash memory chips 418.

Figure 5:
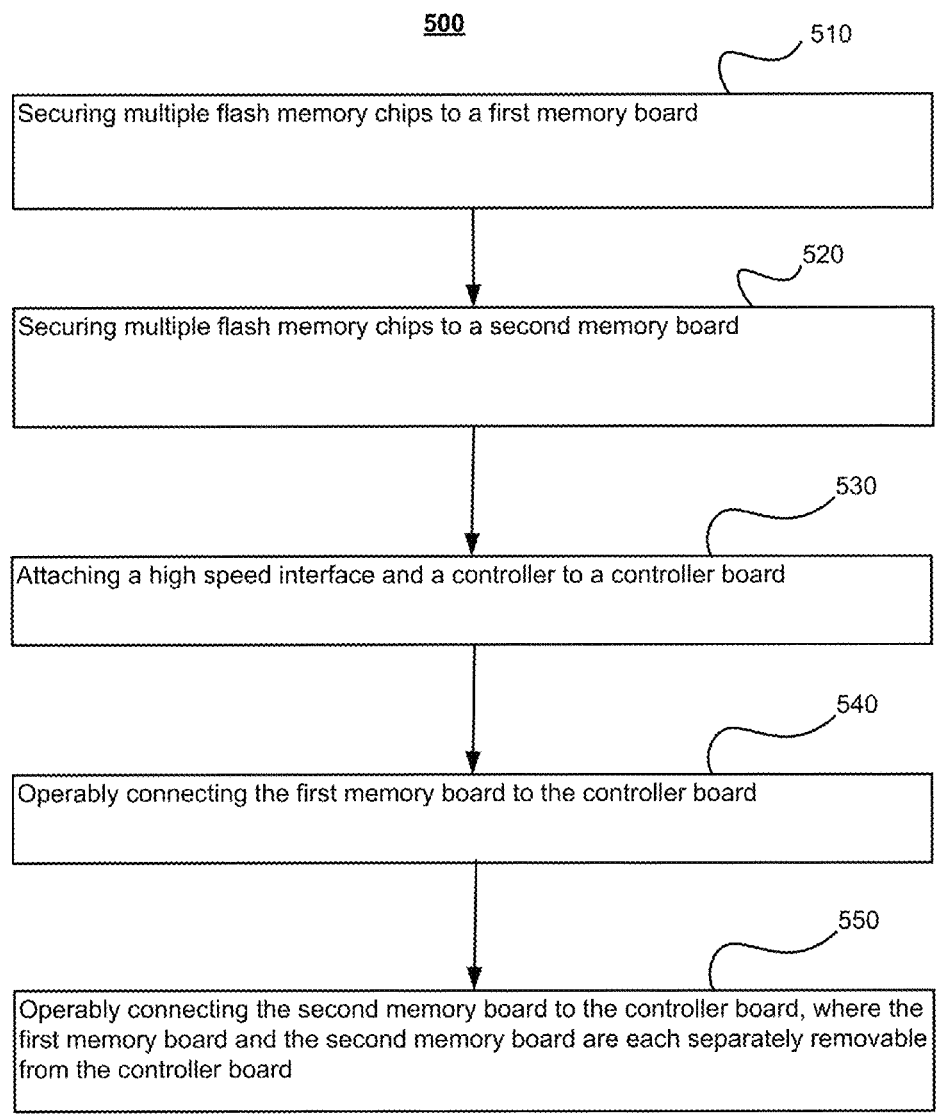
FIG. 5 is an exemplary flowchart illustrating an example assembly of the data storage device of FIG. 1.

Referring to FIG. 5, a process 500 for assembling a data storage device is illustrated. Process 500 may include securing multiple flash memory chips to a first memory board (510) and securing multiple flash memory chips to a second memory board (520). For example, referring also to FIG. 1, multiple flash memory chips 118a may be secured to the memory board 104a and multiple flash memory chips 118b may be secured to the memory board 104b. The memory boards 104a and 104b may be printed circuit boards (PCBs) to which the flash memory chips 118a and 118b are attached, respectively. The amount of storage capacity of each of the memory boards 104a and 104b individually and collectively may depend on the type and number of flash memory chips 118a and 118b secured to the memory boards 104a and 104b. The flash memory chips 118a and 118b may be arranged into one or more channels such that a single channel may control the command processing for multiple flash memory chips, as discussed above.

The flash memory chips 118a and 118b may be a same type of flash memory chip or the flash memory chips on memory board 104a may be different from the flash memory chips on memory board 104b. Also, the memory boards 104a and 104b may include a different number of flash memory chips on each of the memory boards. For example, memory board 104a may include 60 flash memory chips and memory board 104b may include 80 flash memory chips, where the flash memory chips on memory board 104a may either be the same type or a different type of flash memory chip from the flash memory chips on the memory board 104b.

Process 500 may include attaching a high speed interface and a controller to a controller board (530), operably connecting the first memory board to the controller (540) and operably connecting the second memory board to the controller board, where the first memory board and the second memory board are each separately removable from the controller board (550). For example, an interface 108 may be a high speed interface and may be attached to the controller board 102 (530). A controller 110 may be attached to the controller board 102. The controller board 102 may be a PCB to which the high speed interface and the controller are attached.

The memory board 104a may be operably connected to the controller board 102 (540) and the memory board 104b may be operably connected to the controller board (550). The memory board 104a is a separate and distinct memory board from the memory board 104b and each of the memory boards 104a and 104b may be separately removable from the controller board 102. Together, the assembled controller board 102 and two memory boards 104a and 104b may form a data storage device 100.

In one exemplary implementation, the memory boards 104a and 104b may be disconnected from the controller board 102 and may be replaced with two other memory boards having flash memory chips attached to the other memory boards. The other flash memory boards may include a same type of flash memory chips as the flash memory chips 118a and 118b on the memory boards 104a and 104b or the other flash memory boards may include a different type of flash memory chips. The other flash memory boards also may include a different number of flash memory chips than the memory boards 104a and 104b.

In one exemplary implementation, the assembled data storage device 100, including the memory boards 104a and 104b connected to the controller board 102, may form a drive bay form factor that is configured to fit in a drive bay of a computing device. For example, referring to FIGS. 2 and 3, the data storage device 100 of FIG. 2 may be configured to fit in a drive bay slot of a computing device such as, for instance, the drive bay slot 335 of server 330 or the drive bay slot 345 of server 340.

Figure 6:
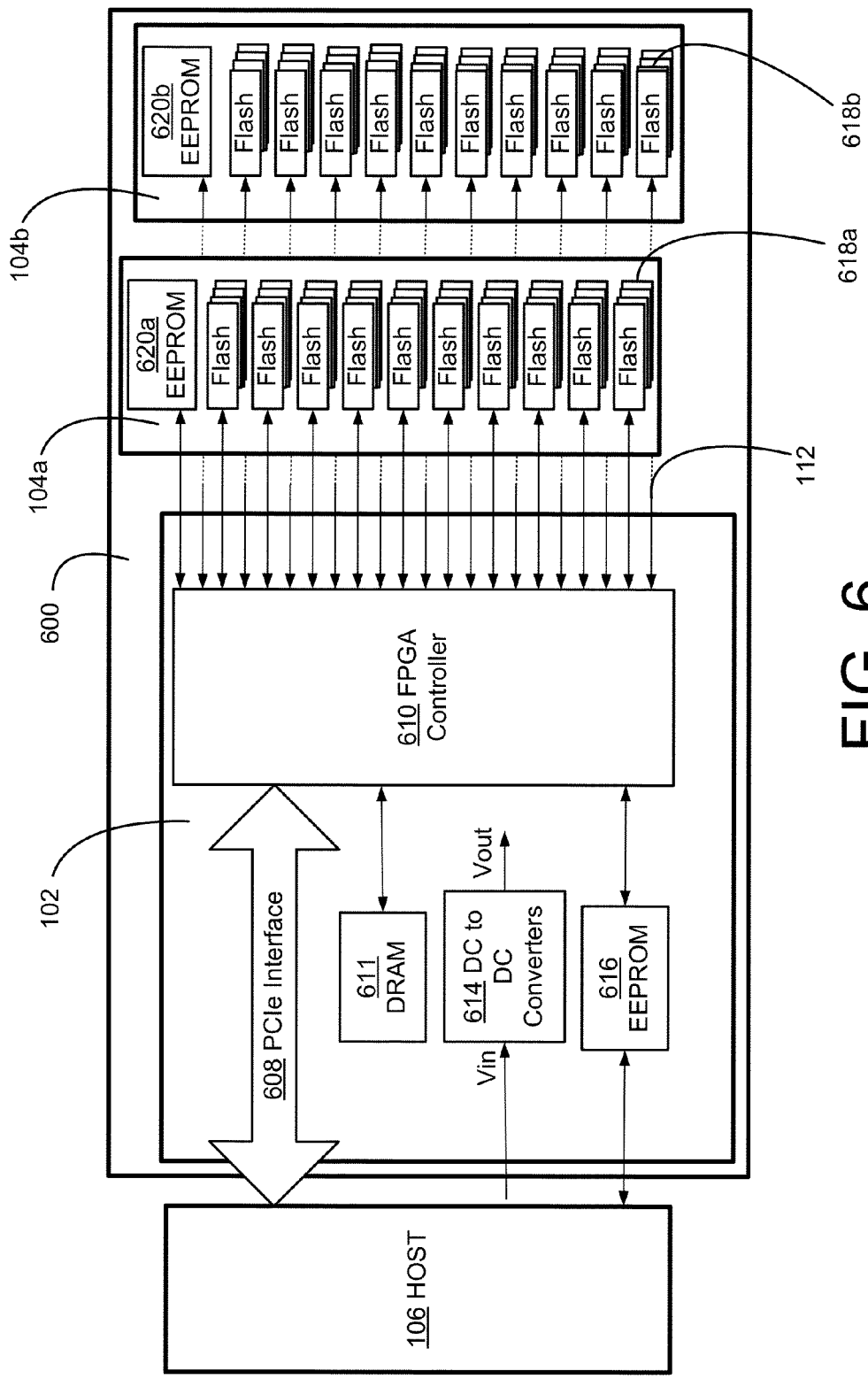
FIG. 6 is an exemplary block diagram of an example implementation of the data storage device of FIG. 1.

Referring to FIG. 6, an exemplary implementation of the data storage device 100 of FIG. 1 is illustrated as data storage device 600. The data storage device 600 may include a controller board 102 that includes a PCIe interface 608 with the host 106, a FPGA controller 610, the DRAM 611, DC to DC converters 614 and an EEPROM 616. The data storage device also may include memory boards 104a and 104b having flash memory chips 618a and 618b, respectively. In one implementation, the flash memory chips 618a and 618b are NAND flash memory chips. As in FIG. 1, the FPGA controller 610 may control the flash memory chips 618a and 618b using multiple channels 112, where each of the multiple channels 112 may control one or more of the flash memory chips 618a and 618b.

Referring back to FIG. 1, the controller 110 (including as examples the FPGA controller 410 of FIG. 4 and the FPGA controller 610 of FIG. 6) may be arranged and configured to control command processing for multiple different types of flash memory chips 118a and 118b, automatically recognize a type of the flash memory chips 118a and 118b on the flash memory boards 104a and 104b and execute received commands using the different types of flash memory chips 118a and 118b. The controller 110 may be configured to process commands for different types of flash memory chips by translating the commands to the native flash memory chip commands. The host is not required to take into account the native flash memory chip commands, because the controller takes the host commands and, if needed, coverts the host commands to the native flash memory chip commands. For instance a read command received from the host is able to be processed by the controller 110 without the host having to translate the read command into another command so that it can operate on flash memory chips from a specific vendor.

Figure 7:
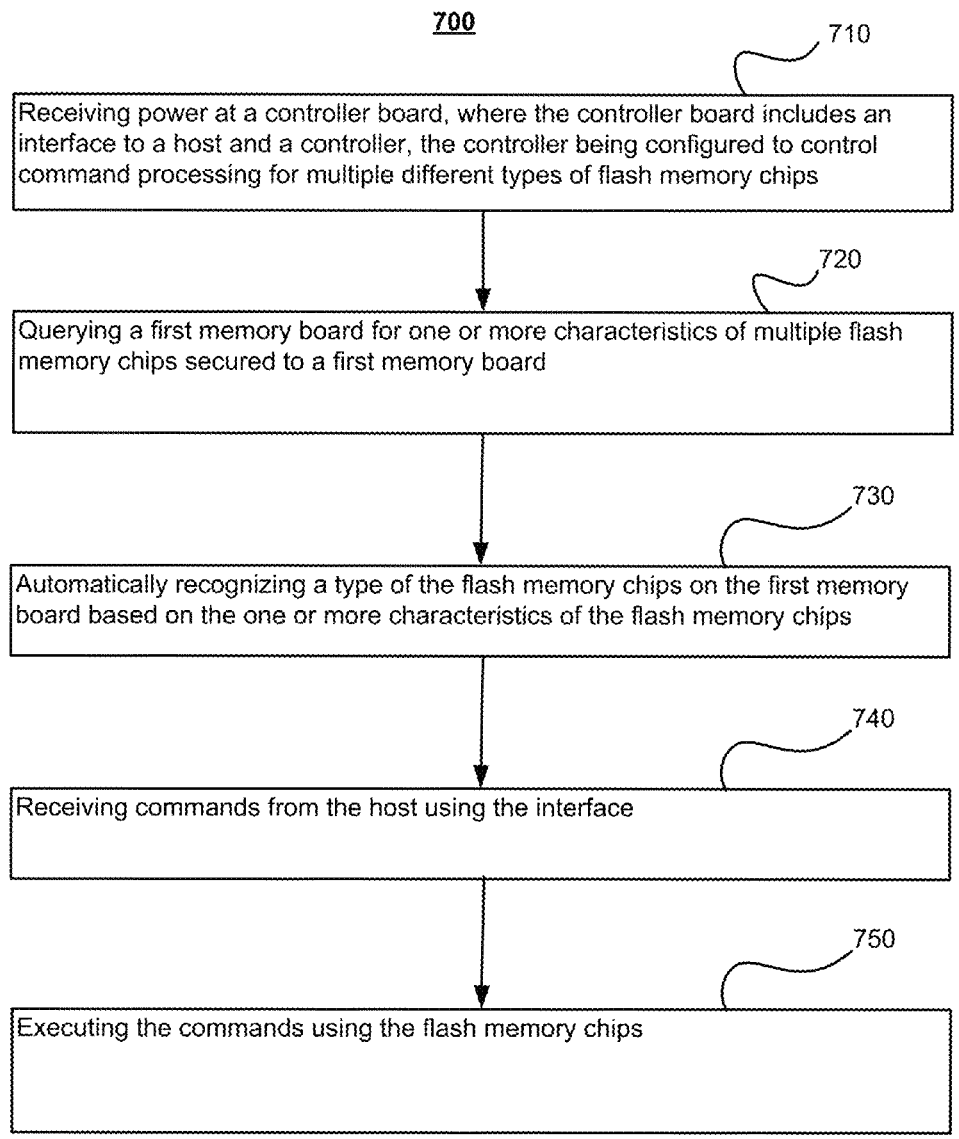
FIG. 7 is an exemplary flowchart illustrating example operations of the data storage device of FIG. 1.

Referring to FIG. 7, a process 700 illustrates that the controller 110 may be configured to automatically recognize and operate with different types of flash memory chips. Process 700 includes receiving power at a controller board, where the controller board includes an interface to a host and a controller (710). The controller may be configured to control command processing for multiple different types of flash memory chips (710). For example, the controller board 102 may receive power (Vin) at the power module 114. In one exemplary implementation, the power module 114 may include one or more DC to DC converters (e.g., DC to DC converter 614 of FIG. 6). The controller board 102 may include an interface 108 and a controller 110. The controller 110 may be configured to control command processing for multiple different types of flash memory chips 118a and 118b.

Process 700 may include querying a first memory board for one or more characteristics of multiple flash memory chips secured to a first memory board (720). In one exemplary implementation, the controller 110 may be configured to query the memory module 120a for the device characteristics of the flash memory chips 118a secured to the memory board 104a (720). The device characteristics may include, for example, may include whether the chips are SLC chips or MLC chips, whether the chips are NAND or NOR chips, a number of chip selects, a number of blocks, a number of pages per block, a number of bytes per page and a speed of the chips. The memory module 120a may include a serial EEPROM (e.g., EEPROM 620a of FIG. 6).

In another exemplary implementation, the controller 110 may be configured to query the flash memory chips 118a directly. For instance, the controller 110 may be configured to query the device ID page of each of the flash memory chips 118a to determine the device characteristics.

Process 700 may include automatically recognizing a type of the flash memory chips on the first memory board based on the one or more characteristics of the flash memory chips (730). For example, the controller 110 may use the device characteristics to automatically recognize the type of the flash memory chips 118a on the memory board 104a. The flash memory chips 118a may be SLC or MLC devices. The flash memory chips 118a may be NAND chips, NOR chips or other types of chips. The flash memory chips 118a also may be from any one of a number of different flash memory manufacturers.

Process 700 may include receiving commands from the host using the interface (740) and executing the commands using the flash memory chips (750). For example, the controller 110 may be configured to receive commands from the host 106 using the interface 108 and to execute the commands using the flash memory chips 118a. In this manner, the controller 110 may be configured to automatically operate with any type of flash memory chip. Upon power up of the data storage device 100, the controller may determine what type of flash memory chips are on the memory boards and then begin operating with those memory boards to execute commands received from the host.

In one exemplary implementation, the controller 110 may receive one or more configuration updates based on the type of flash memory chips that are determined to be present on the memory boards. For example, the controller 110 may determine that a particular type of flash memory chip is being used on one of the memory boards and this information may be reported back to the host. The host 106 may communicate one or more configuration updates to the controller 110, where the controller 110 may receive and process these updates at the information and configuration interface module 458 of FIG. 4.

In one exemplary implementation, the controller 110 may be configured to automatically recognize different types of flash memory chips on the same memory board. For instance, half of the flash memory chips 118a on the memory board 104a may be SLC NAND flash memory chips and the other half of the flash memory chips 118s on the memory board 104a may be MLC NAND flash memory chips. The controller 110 may be configured to execute commands for both of these types of flash memory chips even on the same memory board.

In another exemplary implementation, the controller 110 may be configured to recognize when two memory boards are removed from the controller board 102 and replaced with new memory boards, which may or may not have a different type of flash memory chips. In this manner, the controller 110 enables great flexibility in tailoring the data storage device 100 to meet the specific application needs of the host 106. Specific types of flash memory chips may be used, including different types of chips on the same memory board and/or different types of chips on each of the memory boards, to meet the desired characteristics needed by the specific application of the host 106.

Figure 8:
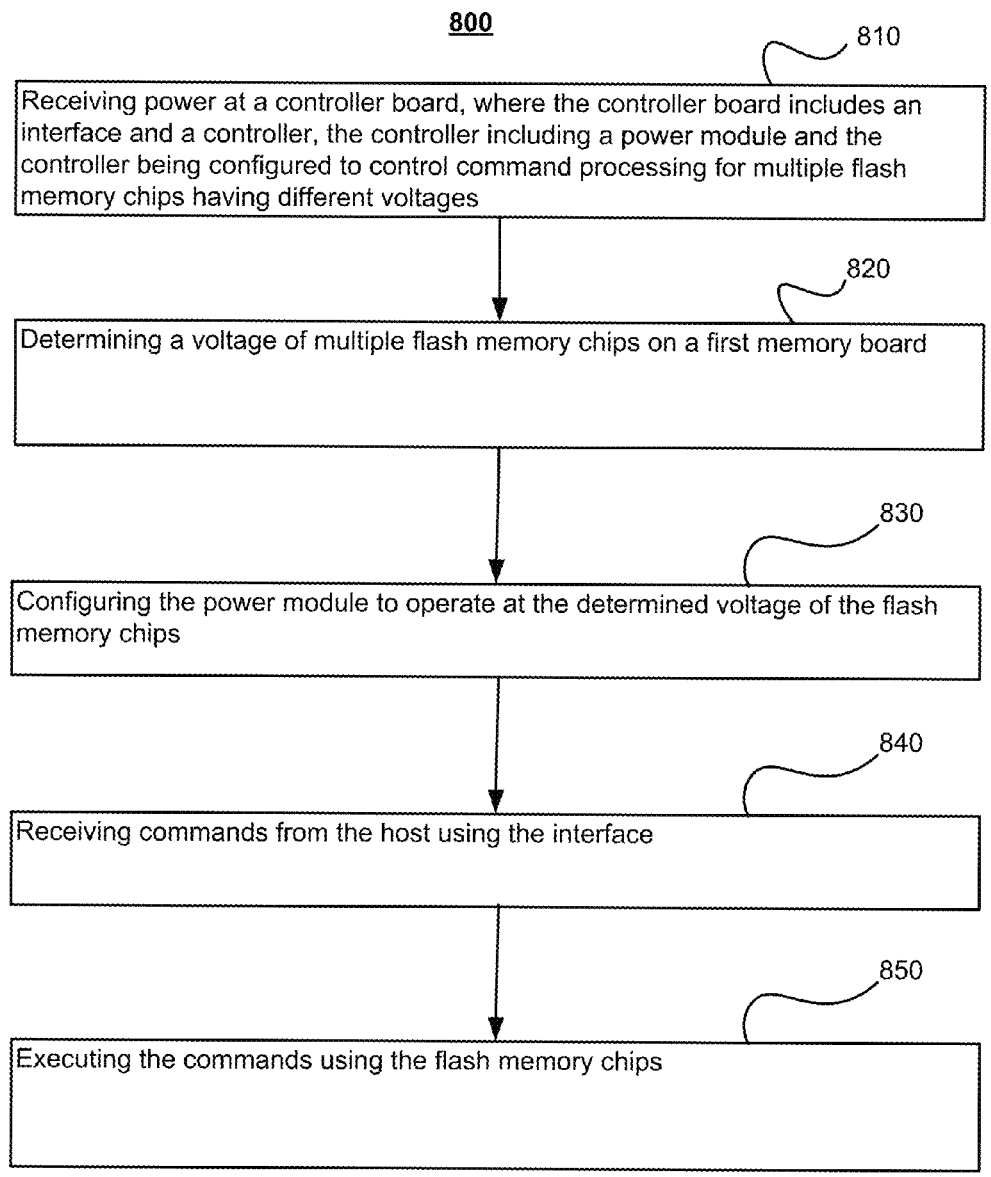
FIG. 8 is an exemplary flowchart illustrating example operations of the data storage device of FIG. 1.

Referring to FIG. 8, an exemplary process 800 illustrates that the controller is configured to operate with flash memory chips having different voltages. Process 800 may include receiving power at a controller board, where the controller board includes an interface and a controller and the controller includes a power module. The controller is configured to control command processing for multiple flash memory chips having different voltages (810). For example, the controller board 102 may be configured to receive power (Vin) from the host 106 and the controller board may include an interface 108 and a controller 110, whether the controller 110 may include a power module 114. The controller 110 may be configured to control command processing for multiple flash memory chips having different voltages. For instance, the controller 110 may be configured to control flash memory chips that operate at 1.2 v, 1.8 v, 3.3 v or other voltages.

Process 800 includes determining a voltage of flash memory chips on a first memory board (810). For example, the controller 110 may be configured to sense a voltage of the flash memory chips based on signal levels of pins on a connector between the controller board 102 and the memory board 104a. The signal levels (e.g., a grouping of logic highs and/or logic lows) may indicate the voltage needed by the flash memory chips 118a. Process 800 includes configuring the power module to operate at the determined voltage of the flash memory chips (830). For example, the controller 110 may be configured to configure the power module 114 based on the voltage sensed at the pins on the connector between the controller board 102 and the memory board 104a. In one exemplary implementation, the power module 114 includes one or more DC to DC converters (e.g., DC to DC converters 614 of FIG. 6). The power module 114 may be set to operate at the sensed voltage.

Process 800 includes receiving commands from the host using the interface (840) and executing the commands using the flash memory chips (850). For example, the controller 110 may be configured to receive commands from the host 106 using the interface 108 and to execute the commands using the flash memory chips 118a. In this manner, the memory boards 104a and 104b may include chips with the same voltage, where the memory boards 104a and 104b are connected to the controller board 102. The memory boards 104a and 104b may be disconnected from the controller board 102 and replaced with other memory boards that have flash memory chips with a different voltage. The controller 110 is configured to automatically recognize the different voltage needed by the flash memory chips on the other memory boards and to configure the power module 114 to operate at the different voltage level.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A data storage device comprising:
a first memory board;
a second memory board, wherein:
the first memory board and the second memory board each comprise multiple memory chips; and
a controller board that is arranged and configured to operably connect to the first memory board and the second memory board, wherein the controller board comprises:
an interface, and
a controller that is arranged and configured to receive commands from a host using the interface and to execute the commands, wherein the controller comprises:
multiple channels, wherein each of the channels is associated with one or more of the memory chips and each of the memory chips is associated with one of the channels, and
multiple channel controllers, wherein each channel controller is assigned to one of the multiple channels and is configured to process commands designated for the memory chips associated with the assigned channel,
wherein the first memory board and the second memory board are each separately removable from the controller board and the first memory board, the second memory board and the controller board are assembled together to form a form factor that is sized to fit in a drive bay of a computing device with the first memory board connected to a top side of the controller board using a ball grid array connector and the second memory board connected to a bottom side of the controller board using a ball grid array connector such that the first memory board, the controller board and the second memory board form the form factor.

2. The data storage device of claim 1 wherein the controller is a field programmable gate array (FPGA) controller.

3. The data storage device of claim 1 wherein the memory chips comprise flash memory chips.

4. The data storage device of claim 3 wherein the flash memory chips are single-level cell (SLC) NAND flash memory chips.

5. The data storage device of claim 3 wherein the flash memory chips are multi-level cell (MLC) NAND flash memory chips.

6. The data storage device of claim 1 wherein the interface is a PCI-e interface.

7. The data storage device of claim 1 wherein the memory chips comprise dynamic random access memory (DRAM) chips.

8. The data storage device of claim 1 wherein the memory chips comprise phase change memory (PCM) chips.

9. The data storage device of claim 3 wherein:
the flash memory chips are NAND flash memory chips,
the interface is a PCI-e interface; and
the controller is a field programmable gate array (FPGA) controller.

10. The data storage device of claim 1 wherein the first memory board and the second memory board are modular boards that are arranged and configured to be removed and replaced by another memory board comprising multiple memory chips.

11. A computing device comprising:
a host; and
a data storage device, the data storage device comprising:
a first memory board;
a second memory board, wherein:
the first memory board and the second memory board each comprise multiple memory chips; and
a controller board that is arranged and configured to operably connect to the first memory board and the second memory board, wherein the controller board comprises:
an interface, and
a controller that is arranged and configured to receive commands from the host using the high speed interface and to execute the commands, wherein the controller comprises:
multiple channels, wherein each of the channels is associated with one or more of the memory chips and each of the memory chips is associated with one of the channels, and
multiple channel controllers, wherein each channel controller is assigned to one of the multiple channels and is configured to process commands designated for the memory chips associated with the assigned channel,
wherein the first memory board and the second memory board are each separately removable from the controller board and the first memory board, the second memory board and the controller board are assembled together to form a form factor that is sized to fit in a drive bay of a computing device with the first memory board connected to a top side of the controller board using a ball grid array connector and the second memory board connected to a bottom side of the controller board using a ball grid array connector such that the first memory board, the controller board and the second memory board form the form factor.

12. The computing device of claim 11 wherein the controller is a field programmable gate array (FPGA) controller.

13. The computing device of claim 11 wherein the memory chips comprise flash memory chips.

14. The computing device of claim 13 wherein the flash memory chips are single-level cell (SLC) NAND flash memory chips.

15. The computing device of claim 13 wherein the flash memory chips are multi-level cell (MLC) NAND flash memory chips.

16. The computing device of claim 11 wherein the interface is a PCI-e interface.

17. The computing device of claim 13 wherein:
the flash memory chips are NAND flash memory chips,
the interface is a PCI-e interface; and
the controller is a field programmable gate array (FPGA) controller.

18. The computing device of claim 11 wherein the first memory board and the second memory board are modular boards that are arranged and configured to be removed and replaced by another memory board comprising multiple memory chips.

19. The computing device of claim 11 wherein the memory chips comprise dynamic random access memory (DRAM) chips.

20. The computing device of claim 11 wherein the memory chips comprise phase change memory (PCM) chips.

21. A method for assembling a data storage device, the method comprising:
securing multiple memory chips to a first memory board;
securing multiple memory chips to a second memory board;
attaching an interface and a controller to a controller board, wherein the controller comprises:
multiple channels, wherein each of the channels is associated with one or more of the memory chips and each of the memory chips is associated with one of the channels, and
multiple channel controllers, wherein each channel controller is assigned to one of the multiple channels and is configured to process commands designated for the memory chips associated with the assigned channel;
operably connecting the first memory board to a top side of the controller board using a ball grid array connector;
operably connecting the second memory board to a bottom side of the controller board using a ball grid array connector, wherein the first memory board and the second memory board are each separately removable from the controller board; and
assembling the first memory board, the second memory board and the controller board to form a form factor that is sized to fit in a drive bay of a computing device.

22. The method as in claim 21 further comprising:
securing multiple memory chips to a third memory board;
disconnecting one of the first memory board or the second memory board from the controller board; and
operably connecting the third memory board to the controller board.

23. The method as in claim 21 wherein the memory chips comprise dynamic random access memory (DRAM) chips.

24. The method as in claim 21 wherein the memory chips comprise phase change memory (PCM) chips.

25. The method as in claim 21 wherein the memory chips comprise flash memory chips.

26. The method as in claim 25 wherein:
the flash memory chips on the first memory board and the second memory are NAND flash memory chips,
the interface is a PCI-e interface; and
the controller is a field programmable gate array (FPGA) controller.

* * * * *

UNITED STATES PATENT AND TRADEMARK OFFICE
CERTIFICATE OF CORRECTION

PATENT NO. : 8,578,084 B2  
APPLICATION NO. : 12/537719  
DATED : November 5, 2013  
INVENTOR(S) : Albert T. Borchers et al.

Page 1 of 1

It is certified that error appears in the above-identified patent and that said Letters Patent is hereby corrected as shown below:

In the Claims

In column 20, line 25, in claim 26, after "second memory" insert -- board --.

Signed and Sealed this  
Third Day of June, 2014

Michelle K. Lee  
*Deputy Director of the United States Patent and Trademark Office*